Patented Dec. 18, 1945

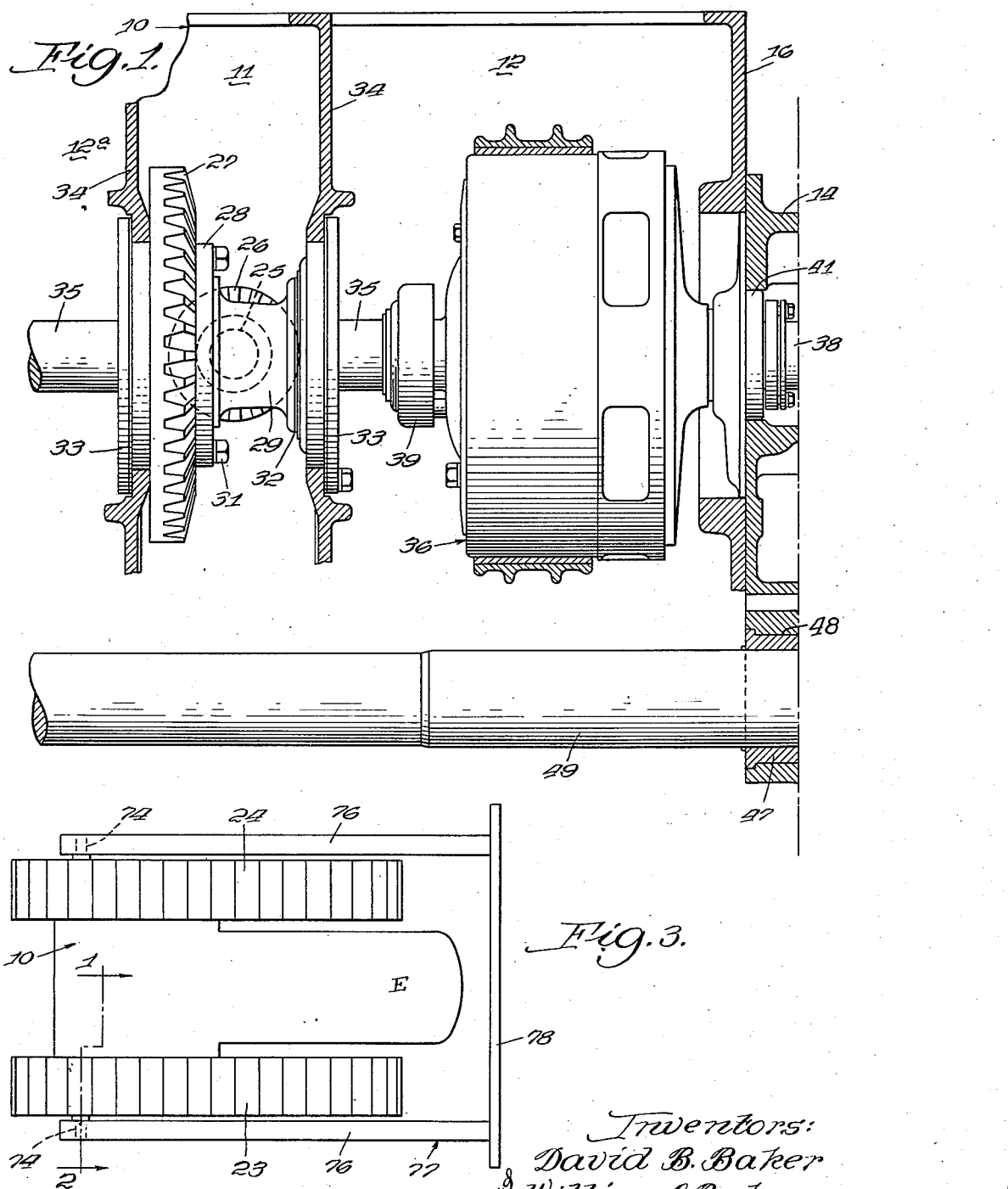

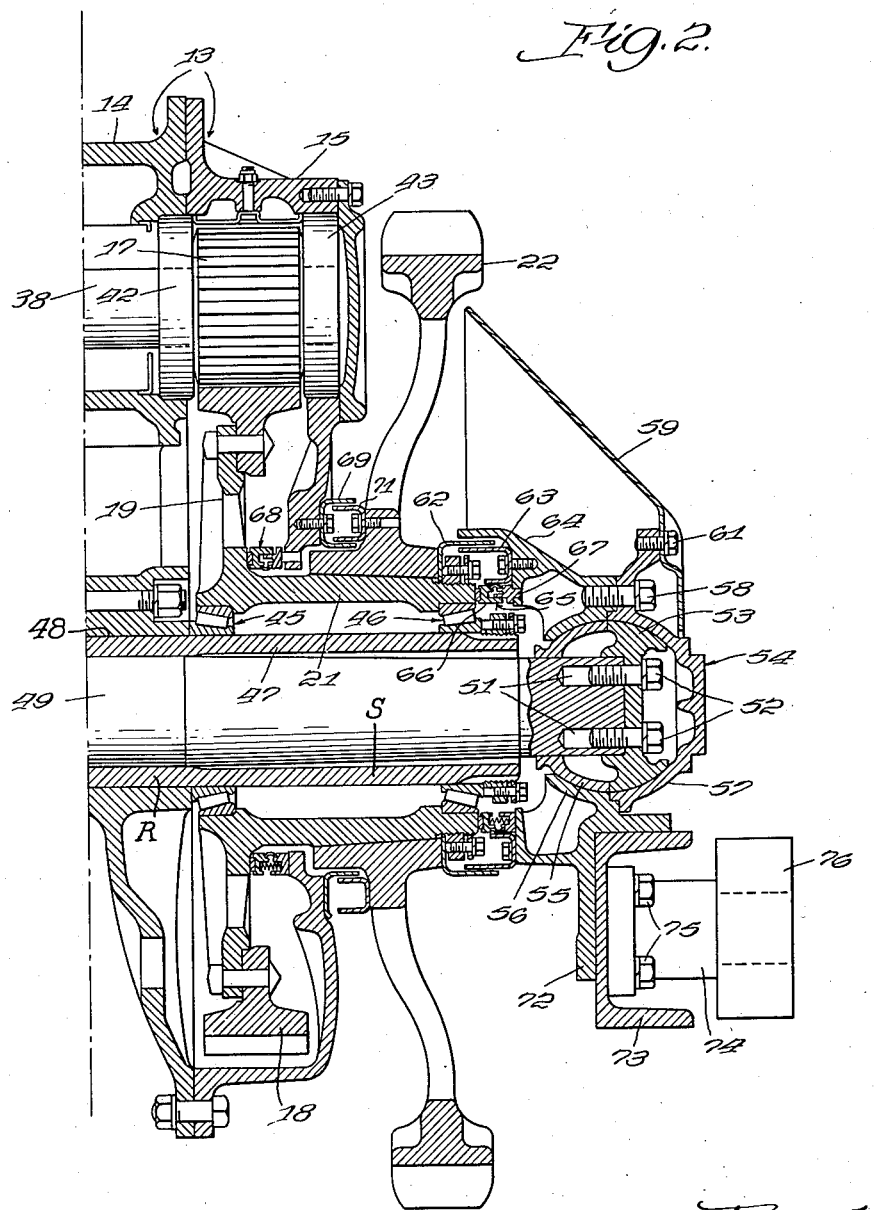

2,391,002

UNITED STATES PATENT OFFICE 2,391,002

FRAME AND DRAWBAR STRUCTURE FOR CRAWLER TRACTORS

David B. Baker, Riverside, and William O. Bechman, Chicago, Ill., assignors to International Harvester Company, a corporation of New Jersey Application June 26, 1944, Serial No. 542,146

5 Claims. (Cl. 180—9.1)

This invention has to do with a tractor frame and relates more particularly to a novel draw-bar mounting therein.

The general object of this invention is the provision in a crawler tractor of a transverse draw-bar and mounting therefor in drive gear compartments at opposite sides of the tractor frame and improved in the respect that the application of load at the draw-bar ends incurs distortion and/or displacement only in the draw-bar virtually exclusively of bearings for gearing in these compartments. Avoiding disturbance of the gearing spacing and alinement in this manner diminishes gear wear, particularly since the pressure on the gear teeth increases with increased load on the draw-bar and the resulting increase in any tendency to strain the gear compartments and their gear bearings.

The above object as well as other desirable objects, capabilities, and advantages of the invention will be more clearly understood upon reading the ensuing description with reference to the two sheets of drawing annexed hereto, and wherein:

Figs. 1 and 2 are complementary views which, when assembled along the dot-dash lines at their edges, form a composite view taken on a vertical plane transversely through a rear frame portion of a crawler tractor and illustrating a preferred form of the invention. This composite view of Figs. 1 and 2 is taken substantially upon the line 1—2 of Fig. 3; and Fig. 3 is a diagrammatic plan view of a crawler tractor of which the apparatus illustrated in Figs. 1 and 2 forms a part.

With the view of more clearly illustrating the invention, environment parts therefor are illustrated but not claimed herein. Claims directed to that part of the apparatus herein shown but not claimed can be found in concurrently filed applications, Serial No. 542,142 to W. O. Bechman et al., Serial No. 542,143 to R. D. Acton, and Serial No. 542,145 to D. B. Baker et al.

With continued reference to the drawings, the back end of the tractor frame 10, which appears at the left end of Fig. 3, is divided into compartments spaced transversely of the frame. In Figs. 1 and 2 that part of the symmetrical compartment structure to the right of a center gear compartment 11 is shown. Immediately to the right of the center gear compartment 11 is a clutch compartment 12 and to the right of this clutch compartment there is a final driving gear compartment 13 consisting of a spacing member 14 and a cover member 15. The compartment 12 is formed integrally with the compartment 11, and the final driving gear compartment 13 is fixed securely to the right wall 16 of the compartment 12 so that these compartments constitute a rigid fabricated structure.

A compartment 12a is formed in the frame 10 to the left of the compartment 11 and is identical with the compartment 12. To the left of the compartment 12a, there is a compartment (not shown) similar to the compartment 13, and the compartment 12a and the final drive gearing compartment, not shown, to the left thereof have parts contained therein and associated therewith which are identical with those contained in and associated with the compartments 12 and 13.

The compartment 13 contains a gear pinion 17 which meshes with a gear 18 attached to a flange 19 upon the inner end of a tubular member or hub 21 having an outer end portion disposed exteriorly of the compartment 13. This exterior portion of the hub 21 has a track driving sprocket 22 rotatably fixed thereto. This sprocket 22 is disposed within the rear end of the endless tread or track 23, Fig. 3, on the right side of the tractor for driving this tread in the conventional manner. A similar arrangement of gears and sprocket, not shown, is provided in the left side of the rear part of the tractor frame for driving the endless track or tread 24 at the left side of the tractor. Power for driving the pinion 17 is transmitted from the tractor engine E, Fig. 3, rearwardly or to the left as viewed in Fig. 3 through any conventional speed transmission, not shown, and a tail shaft 25, Fig. 1, of such a transmission which has a beveled pinion gear 26 formed integrally therewith. The beveled pinion 26 meshes with and drives a bevel gear 27 which is fixed to a flange 28 upon a rotatable tubular member 29 by bolts 31. Said tubular member 29 is rotatably supported in bearing units 32 (one being shown in Fig. 1) at opposite of its ends, and these bearing units are supported in plates 33 within compartment walls 34 at opposite ends of the compartment 11. Tubular member 29 is internally splined and open at its ends for receiving splined portions of shafts 35 extending oppositely thereinto for being rotated thereby.

The rightmost shaft 35, as viewed in Fig. 1, is connected with the driving portion of a multiple disk friction clutch 36, while the driven part of this clutch has a driving connection with the flanged end 37 of a clutch driven shaft 38. The details of the clutch 36, which are not essential to the present disclosure, are fully set forth in the aforesaid application, Serial No. 542,143. The clutch 36 is normally engaged for establishing a driving connection between the shafts 35 and 38 but can be released at will by pressing a throwout bearing unit 39, which may be of conventional construction, to the right as viewed in Fig. 1. The clutch driven shaft 38 is supported in ball bearing units 41, 42, and 43. The above-mentioned gear 17 is rotatably fixed to the shaft 38 in any conventional manner.

The hub member 21 is journaled upon roller bearing units 45 and 46 which are supported upon a tubular member 47 having a root end portion R anchored in an opening 48 in the gear housing 13. The tubular member 47 is inserted into the opening 48 from its inner end and projected outwardly through the outer end of said opening to provide an outboard or spar portion S for the support of the bearing units 45 and 46.

These tubular members 47, the one at the right side of the tractor illustrated in Figs. 1 and 2 and the one not shown at the left side of the tractor, support a draw-bar rod 49 extending therebetween. The right end of the draw-bar rod 49 is tapered as illustrated in Fig. 2 to provide clearance between this portion of the rod and the inner periphery of the tubular bearing support member 47. At the section adjacent to the tapered section in the tubular support member 47, the rod 49 fits firmly into the root portion of said member 47. A similar arrangement is provided for the left end of the rod 49 but not illustrated in the drawings. Each end of the rod 49 is provided with a plurality of threaded recesses 51 which accommodate cap-screws 52 for retaining an outer counterpart 53 of the ball portion of a ball and socket joint 54 on the associated end of the rod. A ball counterpart 55 is placed on the end of the rod prior to the attachment of the counterpart 53. The socket for the ball portion of the ball and socket joint 54 consists of counterparts 56 and 57 held in assembly with the ball portion by cap-screws 58. A stone guard member 59 is secured to the counterparts 57 by cap-screws 61. A dust guard, in the form of flanged rings 62 and 63 attached respectively to the hub 21 and to an annular flanged portion 64 of the socket part 56, is for excluding foreign material from the bearing surfaces of the ball and socket joint on the end of the rod 49 and for excluding such foreign matter from the bearings 45 and 46. An oil seal 65 prevents escape of lubricant from the rubbing parts of said joints and from the space about said bearings. It will be noted that the flanges on the dust guard rings 62 and 63 are slightly spaced radially so that relative movement can occur between the outer end of the draw-bar rod 49 and the tubular bearing support member 47 without deforming or injuring these ring members. The oil seal device 65 is also so constructed that relative movement can occur between members 66 and 67 thereof respectively associated with the hub 21 and the socket counterpart 56 transversely of the rod 49 without injuring or impairing this sealing device.

A second oil seal device 68 is provided between the flange 19 on the hub 21 and the compartment cover member 15 to prevent escape of lubricant from the final drive gear compartment 13, and a dust guard device consisting of opposed flanged rings 69 and 71, respectively, attached to said cover member 15 and to the tread driving sprocket 22 to prevent dust or other foreign matter from working into the space between these parts.

Depending portions 72 of the socket counterparts 56 at opposite sides of the tractor, and of which only the one at the right side of the tractor is illustrated (Fig. 2), serve as supports for respectively associated channels 73 extending forwardly therefrom alongside of the tractor. These channel members 73 have bearing members 74 secured thereto by cap-screws 75, and these bearing members, as illustrated in Figs. 2 and 3, provide a pivotal anchorage for the back ends of thrust members 76 of a bulldozer implement 77 having a blade 78 forwardly of the tractor engine and mounted upon the forward ends of said thrust members. A backward force imposed by the blade 78 upon the thrust members 76 is transmitted to the end of the draw-bar rod 49 through the bulldozer 77, the channel beams 73, and ball and socket devices upon the ends of said rod. Because of the clearance between the end portions of the rod 49 and the outboard or spar portions of the tubular bearing supporting members 47, lateral forces applied to the ends of the rod as by a bulldozer implement can incur lateral displacement of the rod end portions without incurring displacement or a strain of any consequence in said bearing support member therefor. While a load is being exerted upon the ends of the draw-bar rod, the hub 21 for the gears 18 will not be displaced and the desired meshed relation between the gears 18 and the pinion 17 driving the same will be preserved. Wear upon these gears is correspondingly diminished.

Having thus described the invention with reference to a preferred specific embodiment thereof with the view of clearly illustrating the same, we claim:

1. In a tractor propelled by endless treads at its opposite sides, a tractor frame including drive gear compartments at opposite sides thereof, coaxial pivot tubes respectively in said compartments, driver gears through which driving force is transmitted to said treads and respectively journaled on said tubes, and a transverse draw-bar rod mounted in said housings, and opposite end portions of said rod projecting through said tubes in spaced relation therewith to facilitate displacement of said end portions under the influence of a load strain transversely of the rod at its ends, without displacing said tubes and gears.

2. In a tractor propelled by endless treads at its opposite sides, a tractor frame including drive gear compartments at opposite sides thereof, coaxial pivot tubes anchored respectively in said compartments, driver gears through which driving force is transmitted to said treads and respectively journaled on said tubes, and a transverse draw-bar rod mounted in said pivot tubes, and opposite end portions of said rod projecting through said tubes in spaced relation therewith to facilitate displacement of said end portions under the influence of a load strain transversely of the rod at its ends, without displacing said tubes and gears.

3. In a tractor propelled by endless treads at its opposite sides, a tractor frame including drive gear compartments at opposite sides thereof, coaxial pivot tubes anchored respectively in said compartments, driver gears through which driving force is transmitted to said treads and respectively journaled on said tubes, and a transverse draw-bar rod mounted in said pivot tubes, opposite end portions of said rod tapering to a decreased diameter as their associated ends are approached, said tapered end portions being in said tubes to provide clearance therewith which is greater at the outer ends of said tubes, to facilitate bending strain in the rod in the absorption of load stress applied transversely to the rod at its ends, without disturbing the position of said tubes and gears.

4. In a tractor propelled by endless treads at opposite of its sides, a tractor frame including drive gear compartments at opposite sides thereof, each of said compartments having an anchoring opening axially alined with the other transversely of the frame, tubular bearing members having root portions fitted in anchored relation with said openings and spar portions projecting outwardly of the compartments transversely of the frame, hub means journaled on said spar portions and having inner and outer end portions disposed respectively interiorly of their associated compartment and exteriorly thereof, a driving gear rotatively fixed on the inner end portion of each hub means, a tread driving sprocket rotatively fixed on the outer end portion of each hub means, and a draw-bar extending transversely of the tractor frame coaxially with said tubular bearing members and mounted firmly in their root portions, and said draw-bar having end portions of less diameter than the inner periphery of the tubular bearing members and projecting outwardly through the spar portions thereof.

5. In a tractor propelled by endless threads at opposite of its sides, the tractor frame including drive gear compartments at opposite sides thereof, each of said compartments having an anchoring opening axially alined with the other transversely of the frame, tubular bearing means having portions respectively fitted in anchored relation with said openings and spar portions projecting outwardly of the compartments respectively from said fitted portions transversely of the frame, driver gears through which driving force is transmitted to said threads and respectively journaled the spar portions of said tubes, and a drawbar extending transversely of the tractor frame coaxially with said tubular bearing means and mounted firmly in said fitted portions of said tubular bearing means, and said drawbar having end portions within and projecting outwardly beyond said spar portions and of less diameter than the inner periphery of said spar portions.

DAVID B. BAKER.
WILLIAM O. BECHMAN.